April 8, 1969 R. K. MUSSELMAN 3,437,528
ELECTROLYTE RELEASE VALVE AND VENT FOR RESERVE BATTERY
Filed Nov. 7, 1966 Sheet 1 of 2
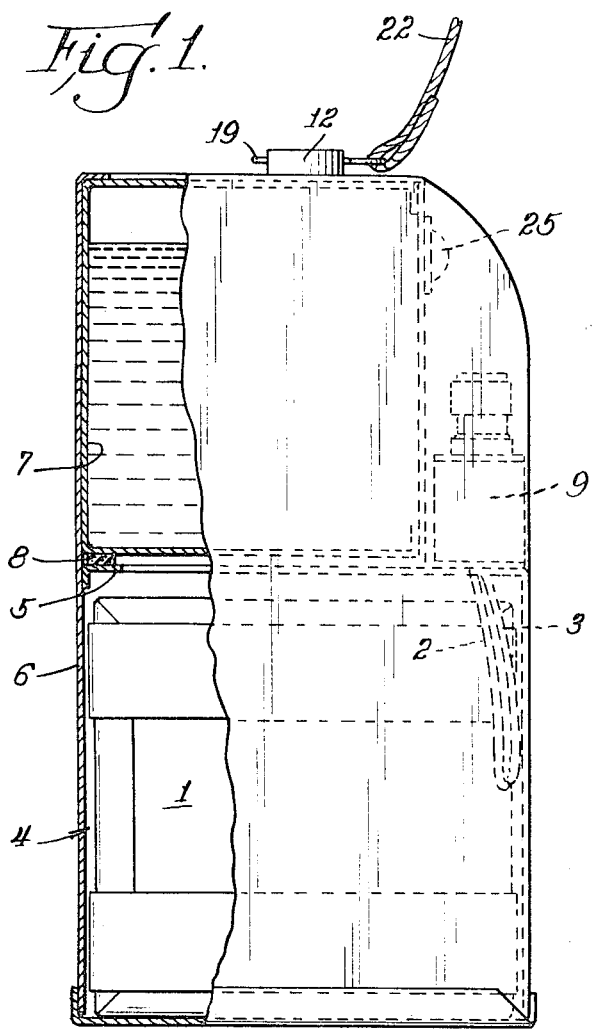
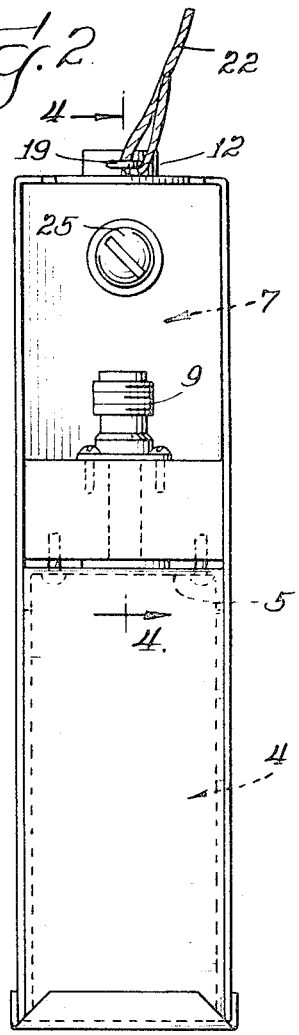
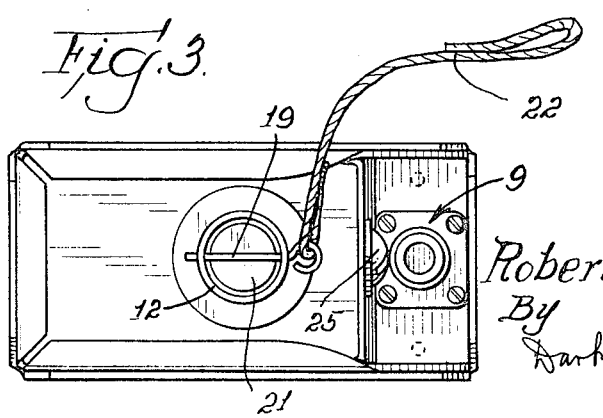
Inventor
Robert K. Musselman
By
Dark, Robertson & Vandenburgh
Att'ys.

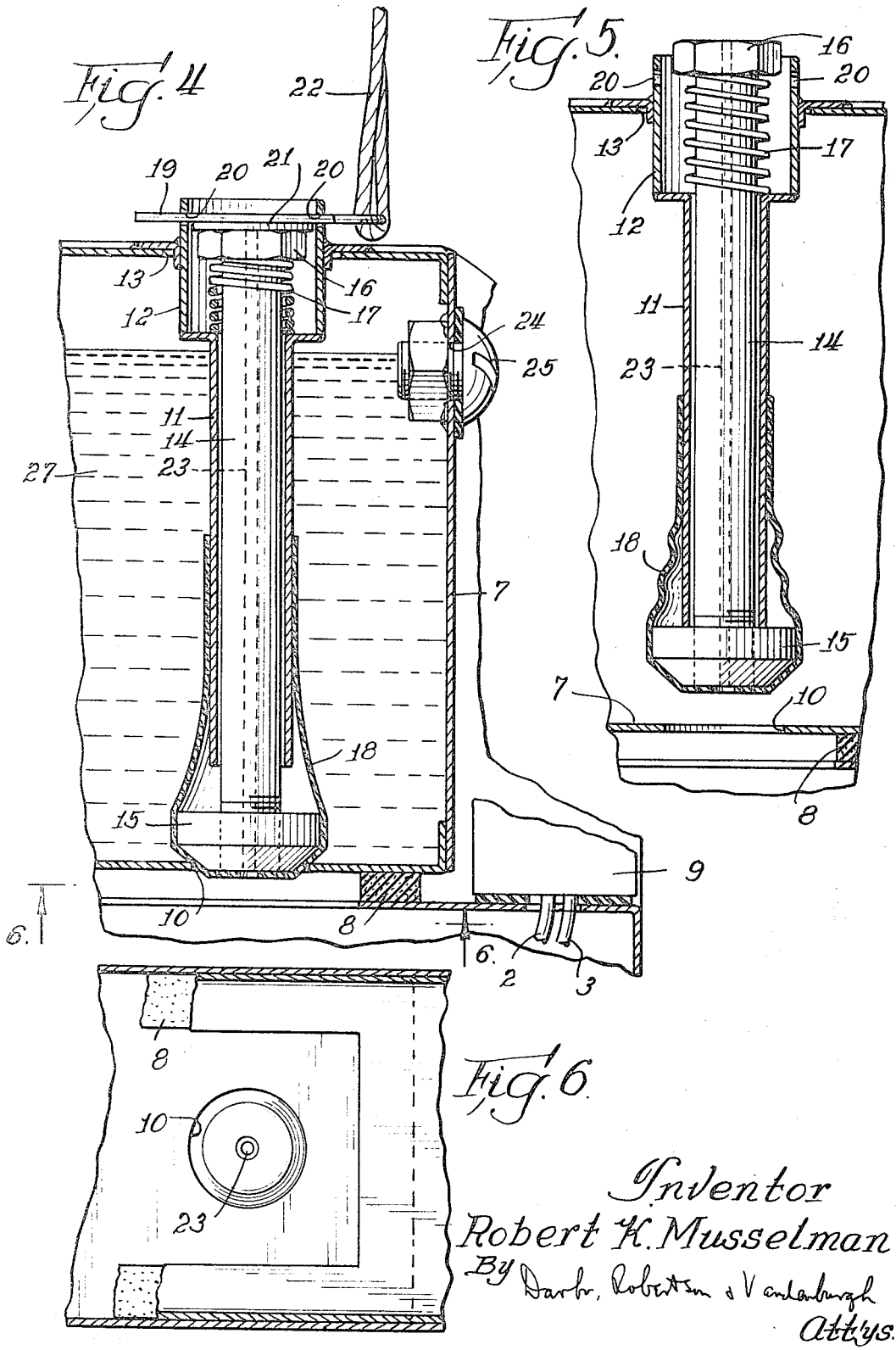

United States Patent Office 3,437,528
Patented Apr. 8, 1969

3,437,528
ELECTROLYTE RELEASE VALVE AND VENT FOR RESERVE BATTERY
Robert K. Musselman, Chippawa, Ontario, Canada, assignor to Servel (Canada) Limited, Niagara Falls, Ontario, Canada, a corporation
Filed Nov. 7, 1966, Ser. No. 592,379
Int. Cl. H01m 1/06, 1/08, 17/06
U.S. Cl. 136—90                                7 claims This invention relates to electric batteries, particularly batteries of the deferred action or reserve type, and especially to a valve for releasing electrolyte from its container for introduction into the battery compartment when the battery is to be activated and a vent for the escape of gases as they are generated in the battery compartment after activation.

In one type of reserve battery, the unit is manufactured and supplied with two compartments, one containing the battery, complete except for the electrolyte, the other containing the battery electrolyte. Because the battery is dry, there is no appreciable electrochemical action or other change in the condition of the battery prior to activation by introduction of the electrolyte so that the unit does no deteriorate appreciably on standing and has an indefinite shelf life. When the battery is to be put into use, it is desirable that externally operable means be provided to permit rapid flow of the electrolyte into the battery compartment for the prompt buildup of the rated voltage of the battery and current capacity. It is also desirable to provide means for the venting of gases from the interior of the battery unit to the atmosphere after the battery has been activated. At the same time, leakage of the electrolyte or other liquids from the battery should be prevented.

The principal object of the invention is to provide, in a reserve type of electric battery, a quick acting valve for the sure and rapid release of electrolyte from the electrolyte compartment to the battery compartment. A further object is to provide such a valve which is not only operable externally of the battery, but also has exposed parts which move when the valve is opened so that the fact of operation is observable from outside of the battery.

Another object of the invention is to establish a gas vent connection of the interior of the battery with the atmosphere concurrently with, and as a consequence of the act of, the opening of the valve.

In the accompanying drawings,

FIG. 1 is a side elevational view, partly in section, of the reserve battery which incorporates the invention;

FIG. 2 is a front view of the battery;

FIG. 3 is a top view of the battery;

FIG. 4 is a cross-sectional view of the valve structure of the battery, taken at the line 4—4 of FIG. 2;

FIG. 5 is a cross-sectional view of the valve of FIG. 4 but shown in open position, and FIG. 6 is a partial view in cross section taken at the line 6—6 of FIG. 4.

The invention contemplates a battery unit in which an electrolyte compartment is arranged above a battery compartment and the valve structure extends from the top to the bottom of the electrolyte compartment. A plug affixed to the bottom end of a vertical valve shaft normally closes a central opening in the floor of the electrolyte container. The shaft is spring loaded and a release mechanism is arranged at the top of the battery for triggering the valve. A small axial bore in the valve shaft provides a gas vent from the interior of the battery to the atmosphere. A flexible sheath is used to seal off the interior of the valve structure, which is open to the atmosphere, from the interior of the electrolyte compartment.

Referring to the drawings for a more complete and detailed description of the invention, the battery unit is shown in FIGS. 1–3. A battery 1 having terminal leads 2 and 3 is mounted within battery compartment 4 formed by walls 5 and outer battery container 7. An electrolyte container 6 is mounted on top of the battery compartment within the outer battery shell 6. Preferably, these parts are fabricated from stainless steel. A gasket 8 is arranged between battery compartment wall 5 and the floor of electrolyte container 7 at the periphery thereof to prevent the escape of electrolyte.

A socket 9 is mounted on the battery, as shown, and battery leads 2 and 3 are connected to the socket terminals for connection of the battery to an external circuit.

A round hole 10 (FIGS. 4–6) of substantial size is provided in the floor of electrolyte compartment 7. The periphery of the hole serves as the valve seat. The valve, itself, is supported within a sleeve 11 having an enlarged upper portion 12 which defines a cup for the reception of the valve operating mechanism. The sleeve structure is mounted in an opening 13 in the top wall of electrolyte container 7 in vertical alinement with the valve seat opening 10. Thus, the cupped sleeve valve supporting structure depends downwardly into the electrolyte compartment from the top of this compartment which is also the top of the battery. A valve stem 14, preferably of nylon or similar plastic material and threaded at both ends, is arranged coaxially within sleeve 11. A valve washer 15 of hard rubber or similar material is screwed onto the bottom end of stem 14 and a nut 16 is screwed onto the top end. A spiral compression spring 17 encircles stem 14 between nut 16 and the shoulder provided by the bottom of the cup-shaped enlargement 12 of sleeve 11. A sheath 18 of flexible material, such as thin rubber, is cemented to valve washer 15 and to the outside of sleeve 11, thus enclosing the open bottom end of sleeve 11. The sheath may extend down around the tapered bottom portion of valve washer 15 or it may extend over only a sufficient portion of the periphery of the washer to permit cementing thereto. If desired, the sheath may be taped to sleeve 11.

To close and cock the valve, stem 14 is forced downwardly against the pressure of spring 17 until the valve washer (or washer covered by sheath 18) firmly engages the floor of the electrolyte compartment at the periphery of opening 10 to close the same against the passage of liquids therethrough. The valve is held in this closed position by a pin 19 which passes through diametrically opposite holes 20 provided near the top of the cup-shaped enlargement 12 of sleeve 11. A disk 21 of rubber, plastic or fibrous material may be interposed between nut 16 and pin 19, if desired, and the position of the valve stem 14, and thus the pressure of the valve against its seat, may be adjusted by turning nut 16 relatively to stem 14. A lanyard 22 may be attached to pin 19, if desired, for the easy withdrawal of the pin when it is desired to open the valve and activate the battery.

A small axial bore 23 extends throughout the length of valve stem 14. The upper terminus of this bore is closed by disk 21 so long as pin 19 is in place to hold the valve in closed position, but with the triggering of the valve, the disk is displaced and bore 23 provides communication of the interior of the battery with the atmosphere for the venting of gases that may otherwise tend to build up an internal pressure.

Suitable means for filling the electrolyte compartment with electrolyte are provided. For example, a hole 24 may be provided in a side wall, near the top of the compartment, and a nylon plug 25 screwed tightly into a nut 26 which is soldered to the inside surface of the compartment wall at the opening, after the electrolyte 27 has been introduced into the compartment.

When finally assembled, the electrolyte is reliably confined within compartment 7. When it is desired to activate the battery, locking pin 19 is withdrawn by means of the lanyard 22, permitting the spring to move the assembly of valve stem 14 upwardly to a position such as that shown in FIG. 5. With the valve thus opened, the electrolyte flows through the opening 10 into the battery compartment to render the battery operational. Gases generated within the battery at any time thereafter may pass to the atmosphere through bore 23 in valve stem 14.

Invention is claimed as follows:

1. In a reserve type electric battery having a battery compartment in the lower part thereof and an electrolyte compartment arranged above the battery compartment, a combined valve and gas vent for releasing the electrolyte to activate the battery and for venting gases generated therein, comprising an open-ended sleeve having an enlarged cup-shaped upper end portion, the top wall and floor of the electrolyte compartment having vertically alined openings therein, said sleeve extending through and mounted in said opening in said top wall with the open top thereof exposed exteriorly of the battery and depending downwardly into said compartment but terminating short of the floor thereof, a valve stem arranged for axial movement within said sleeve and extending into the cup-shaped portion and beyond the bottom end of said sleeve, a valve plug washer affixed to the bottom end of said stem, a flexible sheath extending from said washer to said sleeve enclosing the open bottom end of said sleeve, means for holding said washer in fluid-tight contact with the periphery of said opening in the floor of said electrolyte compartment, and normally cocked spring means for moving said valve stem upwardly to open the valve and release electrolyte from said electrolyte compartment upon the triggering of said spring means, said valve stem having an axial bore throughout its length providing a vent passageway connecting the interior of the battery with the atmosphere when the valve is in open position.

2. A combined valve and gas vent in accordance with claim 1 wherein the opening in the floor of the electrolyte compartment is located at approximately the center of the top of the battery compartment.

3. A combined valve and gas vent in accordance with claim 1 wherein the means for holding the valve washer in fluid-tight contact with the periphery of the opening in the floor of the electrolyte compartment comprises a pin removably extending diametrically across the sleeve through openings near the top of the cup-shaped end of said sleeve outside of the battery, said pin being arranged to bar upward movement of the valve stem from its lowermost position at which the valve washer is in fluid-tight contact with the floor of the electrolyte compartment.

4. A combined valve and gas vent in accordance with claim 3 and including means for adjusting the effective length of the valve stem so that the valve is securely closed when the pin is in position.

5. A combined valve and gas vent in accordance with claim 4 wherein said means for adjusting the effective length of the valve stem comprises a nut threaded upon the top end of the stem and having its top surface thereabove for engagement of the pin.

6. A combined valve and gas vent in accordance with claim 3 and including a disk interposed between the top of the valve stem and the pin to cover and close the top of the axial bore in the stem.

7. A combined valve and gas vent in accordance with claim 5 wherein the normally cocked spring means comprises a compression spring arranged and normally compressed between the bottom of the cup-shaped upper end portion of the sleeve and the nut upon the upper end of the valve stem.

References Cited

UNITED STATES PATENTS

| | | | |
|---|---|---|---|
| 2,787,650 | 4/1957 | Blaru | 136—90 |
| 3,275,477 | 9/1966 | Schmid-Wildy | 136—114 XR |
| 3,326,724 | 6/1967 | Armitage | 136—90 |

WINSTON A. DOUGLAS, *Primary Examiner.*

A. SKAPARS, *Assistant Examiner.*

U.S. Cl. X.R.

136—14, 178